US012562374B2

(12) United States Patent
Uchiyashiki et al.

(10) Patent No.: US 12,562,374 B2
(45) Date of Patent: Feb. 24, 2026

(54) ELECTRODE PLATE FOR NON-AQUEOUS ELECTROLYTE SECONDARY BATTERY AND NON-AQUEOUS ELECTROLYTE SECONDARY BATTERY

(71) Applicant: SANYO Electric Co., Ltd., Kadoma (JP)

(72) Inventors: Junya Uchiyashiki, Hyogo (JP); Haruya Nakai, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 746 days.

(21) Appl. No.: 17/777,754

(22) PCT Filed: Nov. 12, 2020

(86) PCT No.: PCT/JP2020/042218
§ 371 (c)(1),
(2) Date: May 18, 2022

(87) PCT Pub. No.: WO2021/106591
PCT Pub. Date: Jun. 3, 2021

(65) Prior Publication Data
US 2022/0416224 A1 Dec. 29, 2022

(30) Foreign Application Priority Data
Nov. 29, 2019 (JP) ................................. 2019-216832

(51) Int. Cl.
H01M 4/36 (2006.01)
H01M 4/62 (2006.01)
H01M 4/02 (2006.01)

(52) U.S. Cl.
CPC ........... H01M 4/364 (2013.01); H01M 4/623 (2013.01); H01M 4/625 (2013.01); H01M 2004/021 (2013.01)

(58) Field of Classification Search
CPC ...... H01M 4/364; H01M 4/623; H01M 4/625; H01M 2004/021; Y02E 60/10
See application file for complete search history.

(56) References Cited

U.S. PATENT DOCUMENTS

2017/0229711 A1 8/2017 Yamakawa et al.
2018/0277848 A1 9/2018 Matsumura et al.

FOREIGN PATENT DOCUMENTS

JP 2013-77476 A 4/2013
JP 2016134217 A * 7/2016 ............. Y02E 60/10
(Continued)

OTHER PUBLICATIONS

International Search Report dated Jan. 19, 2021, issued in counterpart International Application No. PCT/JP2020/042218 (2 pages).

*Primary Examiner* — Kaity V Chandler
(74) *Attorney, Agent, or Firm* — WHDA, LLP

(57) ABSTRACT

This electrode plate for a non-aqueous electrolyte secondary battery comprises: an electrode core with an undercoat layer formed on the surface thereof; and an electrode composite layer formed on the undercoat layer of the electrode core. The undercoat layer can be obtained by applying an undercoat dispersion liquid on the surface of the electrode core and drying the dispersion liquid. The average diameter of an electroconductive auxiliary agent used for the undercoat layer is no greater than 12 nm. The molecular weight of a binder used for the undercoat layer is no less than 900,000. The thickness of the undercoat layer is no greater than 20 µm. The molecular weight of a binder used for the electrode composite layer is no less than 900,000.

3 Claims, 2 Drawing Sheets

(56)  References Cited

FOREIGN PATENT DOCUMENTS

| | | | | | |
|---|---|---|---|---|---|
| JP | 2019-36490 | A | | 3/2019 | |
| JP | 2019-145306 | A | | 8/2019 | |
| JP | 2019175729 | A | * | 10/2019 | ............. Y02E 60/10 |
| WO | 2016/024394 | A1 | | 2/2016 | |
| WO | 2017/056488 | A1 | | 4/2017 | |
| WO | WO-2020203997 | A1 | * | 10/2020 | .......... H01M 50/409 |

* cited by examiner

ELECTRODE PLATE FOR NON-AQUEOUS ELECTROLYTE SECONDARY BATTERY AND NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/042218 filed on Nov. 12, 2020 which claims the benefit of priorities under 35 U.S.C. § 119(a) of Japanese Patent Application No. 2019-216832 filed in Japan on Nov. 29, 2019, the contents of which are incorporated herein by reference.

TECHNICAL FIELD

The present disclosure relates to an electrode plate for non-aqueous electrolyte secondary battery and a non-aqueous electrolyte secondary battery.

BACKGROUND

Patent Literature 1 describes a configuration of a lithium ion secondary battery (non-aqueous electrolyte secondary battery), in which, in order to improve the performance of the secondary battery, a slurry prepared by mixing carbon nanofibers with a solvent is applied to a surface of an aluminum foil (electrode core) constituting a positive electrode plate, which is an electrode plate, and the slurry is dried and then heated to fix the carbon nanofibers on the surface of the aluminum foil. Patent Literature 1 states that, with this configuration, the resistance at the surface of the aluminum foil is sufficiently reduced.

Patent Literature 2 describes a configuration of a positive electrode plate for non-aqueous electrolyte secondary battery, in which an intermediate layer containing a conductive agent and a binder is provided between a positive electrode core (electrode core) and a positive electrode mixture layer (electrode mixture layer). As the conductive agent in the intermediate layer. Patent Literature 1 describes using a carbon material such as acetylene black, carbon black, carbon fibers, or the like.

CITATION LIST

Patent Literature

PATENT LITERATURE 1: Japanese Unexamined Patent Application Publication No. 2013-77476
PATENT LITERATURE 2: WO 2016/024394 A

SUMMARY

In order to increase the output and to improve the durability performance of a non-aqueous electrolyte secondary battery, it is desired to reduce the resistance at a surface of an electrode core of an electrode plate in the non-aqueous electrolyte secondary battery, or more specifically, it is desired to reduce the interfacial resistance, which is the resistance between the electrode core and an electrode mixture layer. According to the configuration of the carbon nanofibers included in the positive electrode plate as described in Patent Literature 1, the effect of reducing the interfacial resistance is not sufficient. In particular, when the secondary battery is in use, the electrode plate is in a state swollen with a non-aqueous solvent, which is an electrolyte solution solvent, of a non-aqueous electrolyte. The electrode plate described in Patent Literature 1 does not have a sufficiently low interfacial resistance in this swollen state. Even with the positive electrode plate including the intermediate layer as described in Patent Literature 2, the effect of reducing the interfacial resistance of the electrode plate swollen with the non-aqueous solvent is not sufficient. Reduction in the interfacial resistance of the electrode plate in the swollen state is desired in terms of increasing the output and improving the durability performance in the actual usage state of the battery.

An electrode plate for non-aqueous electrolyte secondary battery according to one aspect of the present disclosure includes an electrode core having an undercoat layer formed on its surface, and an electrode mixture layer formed on the undercoat layer of the electrode core. The average diameter of a conductive auxiliary agent used for the undercoat layer is 12 nm or smaller. The molecular weight of the binder used for the undercoat layer is 900,000 or higher. The thickness of the undercoat layer is 0.20 μm or smaller. The molecular weight of the binder used for the electrode mixture layer is 900,000 or higher.

A non-aqueous electrolyte secondary battery according to one aspect of the present disclosure includes a positive electrode plate, a negative electrode plate, and a non-aqueous electrolyte. At least one of the positive electrode plate and the negative electrode plate is the electrode plate for non-aqueous electrolyte secondary battery according to the present disclosure.

According to the electrode plate for non-aqueous electrolyte secondary battery and the non-aqueous electrolyte secondary battery according to the present disclosure, the interfacial resistance of the electrode plate swollen with the non-aqueous electrolyte containing a non-aqueous solvent can be sufficiently reduced.

DESCRIPTION OF EMBODIMENTS

The inventors of the present disclosure have found that the interfacial resistance of an electrode plate that has been dried after being swollen with a non-aqueous solvent can be sufficiently reduced when the electrode plate for non-aqueous electrolyte secondary battery comprises: an electrode core having an undercoat layer formed on its surface; and an electrode mixture layer formed on the undercoat layer of the electrode core, wherein: the average diameter of a conductive auxiliary agent used for the undercoat layer is 12 nm or smaller; the molecular weight of the binder used for the undercoat layer is 900,000 or higher; the thickness of the undercoat layer is 0.20 μm or smaller; and the molecular weight of the binder used for the electrode mixture layer is 900,000 or higher. Based on this, the inventors of the present disclosure have found that, with the above-described electrode plate for non-aqueous electrolyte secondary battery, the interfacial resistance of an electrode plate that is swollen with a non-aqueous electrolyte containing a non-aqueous solvent can be sufficiently reduced.

An example embodiment of the present disclosure will now be described in detail. Although the following describes a case in which the electrode plate having the undercoat layer of the present disclosure formed thereon is a positive electrode plate, the electrode plate having the undercoat layer formed thereon may alternatively be a negative electrode plate or both of a positive electrode plate and a negative electrode plate.

Figure 1:
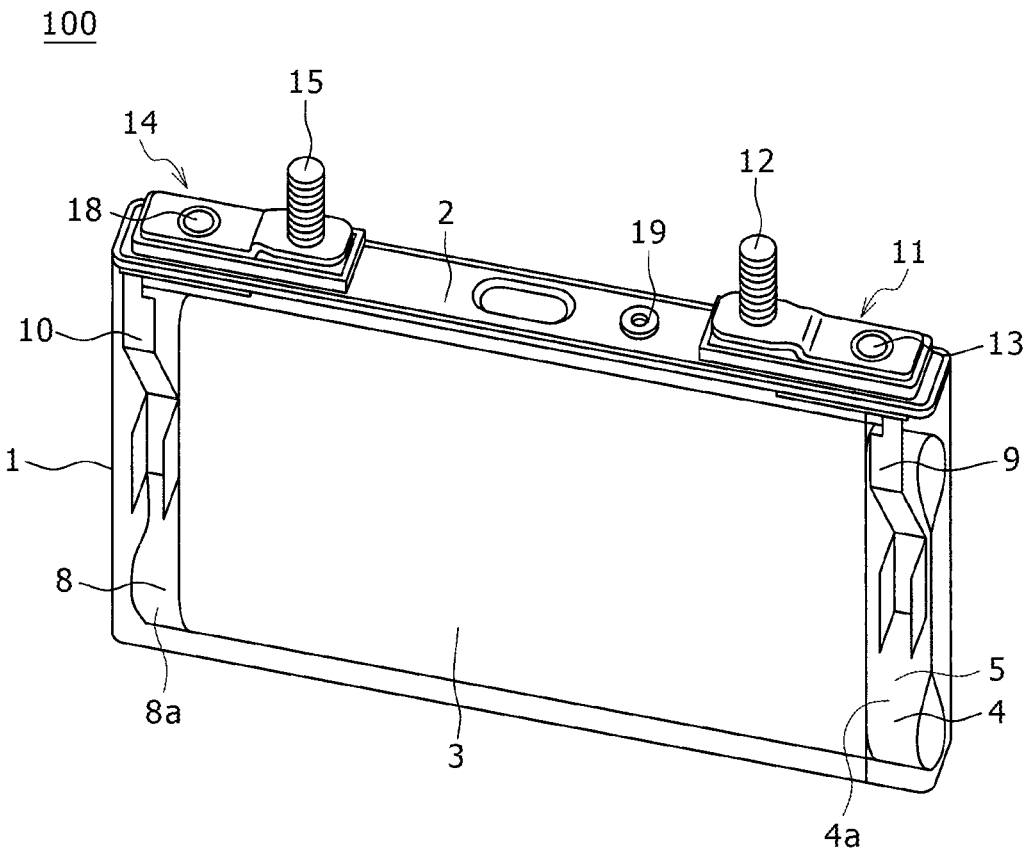
FIG. 1 is a perspective view of a non-aqueous electrolyte secondary battery according to an example embodiment, and shows a structure inside a battery housing with a front side of an outer casing removed.

FIG. 1 is a perspective view of a non-aqueous electrolyte secondary battery 100 according to an example embodiment, and shows a structure inside a battery housing with a front side of an outer casing 1 removed. Although the non-aqueous electrolyte secondary battery 100 having a rectangular metal outer casing 1 is illustrated as an example in the present embodiment, the shape of the outer casing is not limited to a rectangular shape, and may be, for example, a cylindrical shape or the like. Further, although a spiral-type electrode assembly 3 in which a positive electrode plate and a negative electrode plate are wound with separators located between the electrode plates is illustrated as an example, the electrode assembly may be of a laminated type formed by alternately laminating a plurality of positive electrode plates and a plurality of negative electrode plates one by one via separators. Further, although a case in which the mixture layer in each of the positive and negative electrode plates is formed on both sides of the core is illustrated as an example, the present disclosure is not limited to a case in which each core has mixture layers formed on both sides, and it is sufficient so long as each core has a mixture layer formed on at least one surface. Hereinafter, the non-aqueous electrolyte secondary battery 100 will be referred to as "the secondary battery 100".

As illustrated for example in FIG. 1, the secondary battery 100 comprises: a spiral-type electrode assembly 3 in which a positive electrode plate 4 and a negative electrode plate 8 are wound with separators located between the electrode plates and are formed into a flat shape having a flat part and a pair of curved parts; a non-aqueous electrolyte; and an outer casing 1 that houses the electrode assembly 3 and the non-aqueous electrolyte. An opening end of the outer casing 1 is closed with a sealing plate 2. Both of the outer casing 1 and the sealing plate 2 are made of metal, and are preferably made of aluminum or an aluminum alloy.

The outer casing 1 has a bottom portion having a substantially rectangular shape as viewed from the bottom face, and a side wall portion erected on the peripheral edge of the bottom portion. The side wall portion is formed perpendicular to the bottom portion.

Figure 2:
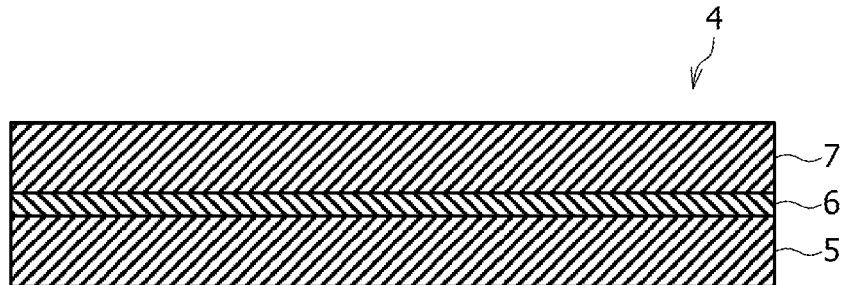
FIG. 2 is a diagram schematically showing a cross section of a positive electrode plate, which is an electrode plate for non-aqueous electrolyte secondary battery according to the example embodiment.

FIG. 2 is a diagram schematically showing a cross section of the positive electrode plate 4 according to the example embodiment. The positive electrode plate 4 is an elongate member comprising: a positive electrode core 5 made of metal; and positive electrode mixture layers 7 formed on both sides of the positive electrode core 5 by being arranged via undercoat layers 6. The positive electrode core 5 corresponds to an electrode core, and each positive electrode mixture layer 7 corresponds to an electrode mixture layer. In FIG. 2, only the undercoat layer 6 and the positive electrode mixture layer 7 on one side (i.e., the upper side in FIG. 2) of the positive electrode plate 4 are shown, and illustration of the undercoat layer and the positive electrode mixture layer on the other side (i.e., the lower side in FIG. 2) is omitted. As shown in FIG. 1, in the positive electrode plate 4, a strip-shaped positive electrode core exposed portion 4a is formed by exposing the positive electrode core 5 at one end in the crosswise direction (i.e., the right end in FIG. 1) and along the lengthwise direction as observed in a developed view. Similarly, the negative electrode plate 8 is an elongate member which comprises a negative electrode core made of metal and negative electrode mixture layers formed on both sides of the negative electrode core, and in which a strip-shaped negative electrode core exposed portion 8a where the negative electrode core is exposed is formed at one end in the crosswise direction (i.e., the left end in FIG. 1) and along the lengthwise direction as observed in a developed view. In the electrode assembly 3, the positive electrode plate 4 and the negative electrode plate 8 are wound with separators located between the electrodes plates, with the positive electrode core exposed portion 4a of the positive electrode plate 4 being arranged on one end side in the axial direction (i.e., the right side in FIG. 1) and the negative electrode core exposed portion 8a of the negative electrode plate 8 being arranged on the other end side in the axial direction (i.e., the left side in FIG. 1).

A positive electrode current collector 9 is connected to a laminated part of the positive electrode core exposed portion 4a of the positive electrode plate 4, and a negative electrode current collector 10 is connected to a laminated part of the negative electrode core exposed portion 8a of the negative electrode plate 8. A positive electrode terminal 11 comprises a positive electrode bolt portion 12 arranged on the battery outer side of the sealing plate 2, and a positive electrode insertion portion 13 that is electrically connected to the positive electrode bolt portion 12 and inserted into a through hole provided in the sealing plate 2. To this positive electrode terminal 11, the positive electrode current collector 9 is electrically connected. Further, a negative electrode terminal 14 comprises a negative electrode bolt portion 15 arranged on the battery outer side of the sealing plate 2, and a negative electrode insertion portion 18 that is electrically connected to the negative electrode bolt portion 15 and inserted into a through hole provided in the sealing plate 2. To this negative electrode terminal 14, the negative electrode current collector 10 is electrically connected.

The positive electrode terminal 11 and the positive electrode current collector 9 are respectively fixed to the sealing plate 2 via insulating members. The negative electrode terminal 14 and the negative electrode current collector 10 are respectively fixed to the sealing plate 2 via insulating members.

The electrode assembly 3 is housed in the outer casing 1. The sealing plate 2 is connected to an opening edge part of the outer casing 1 by laser welding or the like. The sealing plate 2 has an electrolyte injection port 19, and this electrolyte injection port 19 is sealed with a sealing plug after the non-aqueous electrolyte is injected into the outer casing 1.

The non-aqueous electrolyte contains a non-aqueous solvent and an electrolyte salt dissolved in the non-aqueous solvent. As the non-aqueous solvent, for example, carbonates, lactones, ethers, ketones, esters, and the like can be used, and two or more of these solvents can be mixed and used. When mixing and using two or more kinds of solvents, it is preferable to use a mixed solvent containing a cyclic carbonate and a chain carbonate. For example, ethylene carbonate (EC), propylene carbonate (PC), butylene carbonate (BC), and the like can be used as the cyclic carbonate, and dimethyl carbonate (DMC), ethyl methyl carbonate (EMC), diethyl carbonate (DEC), and the like can be used as the chain carbonate. The non-aqueous solvent may contain a halogen-substituted product obtained by substituting at least a part of the hydrogens in the above solvents with halogen atoms such as fluorine. As the electrolyte salt, $LiPF_6$, $LiBF_4$, $LiCF_3SO_3$, and the like and mixtures thereof can be used. The amount of the electrolyte salt dissolved in the non-aqueous solvent can be, for example, 0.5 to 2.0 mol/L. Further, an additive such as vinylene carbonate (VC) can be added as appropriate.

A detailed description will now be given regarding the positive electrode plate 4, the negative electrode plate 8, and the separator that constitute the electrode assembly 3, and in particular regarding the positive electrode plate 4.

[Positive Electrode Plate]

As shown in FIG. 2, the positive electrode plate 4 comprises a positive electrode core 5, an undercoat layer 6 formed on a surface of the positive electrode core 5, and a positive electrode mixture layer 7 formed on the undercoat layer 6 of the positive electrode core 5. For the positive electrode core 5, it is possible to use, for example, a foil of a metal that is stable in the potential range of the positive electrode 1 such as aluminum, a film having such a metal disposed on its surface layer, or the like. The positive electrode mixture layer 7 contains, for example, a positive electrode active material, a binder serving as a binding material, a conductive auxiliary agent, and the like.

The undercoat layer 6 is obtained by applying, on the surface of the positive electrode core 5, an undercoat dispersion liquid containing a conductive auxiliary agent 6a (FIG. 3), and drying the applied dispersion liquid. The undercoat layer 6 contains the conductive auxiliary agent 6a and a binder serving as a binding material. As the conductive auxiliary agent 6a, it is preferable to use carbon nanotubes (CNT), which are carbon fibers. The average diameter of the conductive auxiliary agent 6a is 12 nm or smaller, preferably 9 nm or smaller, and more preferably 6 nm or smaller.

The average length of the conductive auxiliary agent 6a used for the undercoat layer 6 is not particularly limited, but is preferably 10 μm or longer, more preferably 40 μm or longer, and further preferably 100 μm or longer.

In the present specification, the average diameter of the conductive auxiliary agent 6a is a value determined by observing 10 conductive auxiliary agent 6a pieces using a scanning electron microscope (SEM), measuring the diameters of the 10 conductive auxiliary agent 6a pieces, and calculating a number average value thereof. Further, the average length of the conductive auxiliary agent 6a is a value determined by observing 10 conductive auxiliary agent 6a pieces using a scanning electron microscope, measuring the lengths of the 10 conductive auxiliary agent 6a pieces, and calculating a number average value thereof more specifically, the conductive auxiliary agent 6a was observed using a scanning electron microscope at an acceleration voltage of 5 kV, and an image (having 1024×1280 pixels) with a magnification of 50,000 times was captured. In the captured image, the diameter and length were measured respectively regarding 10 arbitrary conductive auxiliary agent 6a pieces, and number average values thereof were calculated to determine the average diameter and the average length.

The BET specific surface area of the conductive auxiliary agent 6a for the undercoat layer 6 is not particularly limited, but is preferably 100 $m^2$/g or larger, more preferably 200 $m^2$/g or larger, and further preferably 400 $m^2$/g or larger. The content of the conductive auxiliary agent 6a in the undercoat layer 6 is preferably 75 to 97.5%. The bulk density of the conductive auxiliary agent 6a is not particularly limited, but is preferably 0.008 to 0.01 $g/cm^3$.

Examples of the binder used for the undercoat layer 6 include fluororesins such as polytetrafluoroethylene (PTFE) and polyvinylidene fluoride (PVDF), polyacrylonitrile (PAN), polyimide resins, acrylic resins, polyolefin resins, and the like. These may be used alone or by combining two or more thereof. As the binder used for the undercoat layer 6, polyvinylidene fluoride (PVDF) is preferably used. The molecular weight of the binder for the undercoat layer 6 is 900,000 or higher, and preferably 1.4 million or higher. The binder content in the undercoat layer 6 is preferably 2.5 to 22.5%. A dispersant may also be added to the undercoat layer 6. The solid content ratio (NV) of the undercoat layer 6 is preferably 0.5 to 2.5%.

When forming the above-described undercoat layer 6 on the surface of the positive electrode core 5, a slurry for forming the undercoat layer is prepared as the undercoat dispersion liquid by dispersing the conductive auxiliary agent 6a in a solvent. Examples of the solvent for dispersing the conductive auxiliary agent 6a include N-methyl-2-pyrrolidone (NMP). Next, the prepared slurry is applied to the surface of the positive electrode core 5 by a gravure coating method or the like, and then dried to form the undercoat layer 6. For this drying, heat treatment in a hot air circulation path can for example be used, but the drying method is not limited to this method.

The thickness of the undercoat layer 6 is 0.20 μm or smaller, preferably 0.15 μm or smaller, and more preferably 0.10 μm or smaller. In the present specification, the thickness of the undercoat layer 6 is a value determined by measuring, using a scanning electron microscope, thicknesses in a cross section of the undercoat layer 6 processed by a cross-section processing apparatus (CP), and calculating a number average value thereof. More specifically, for the thickness of the undercoat layer 6, a cross section was observed using a scanning electron microscope at an acceleration voltage of 5 kV, and an image (having 1024×1280 pixels) with a magnification of 50,000 times was captured. In the captured image, the length from a top part of the positive electrode core 5 to the top part of the undercoat layer 6 was measured respectively regarding five arbitrary positions, and a number average value thereof was calculated to determine the thickness of the undercoat layer 6. By using the undercoat layer 6 as described above, the interfacial resistance of the positive electrode plate 4 in the swollen state can be reduced. The coverage of the undercoat layer 6 on the surface of the positive electrode core 5 is preferably 20 to 100%.

The positive electrode plate 4 can be produced by, for example, having the undercoat layer 6 formed on the surface of the positive electrode core 5, applying a positive electrode mixture slurry containing the positive electrode active material, the binder, the conductive auxiliary agent, and the like onto the undercoat layer 6 of the positive electrode core 5, drying the applied slurry to form the positive electrode mixture layer 7, and then rolling this positive electrode mixture layer 7.

Examples of the positive electrode active material include lithium transition metal oxides containing transition metal elements such as Co, Mn, and Ni. Lithium transition metal oxides are, for example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (where M is at least one of Na, Mg, Sc, Y, Mn, Fe, Co, Ni, Cu, Zn, Al, Cr, Pb, Sb, and B, $0<x≤1.2$, $0<y≤0.9$, and $2.0≤z≤2.3$). The foregoing may be used alone or by mixing a plurality thereof. In terms of enabling an increase in the capacity of the secondary battery 100, the positive electrode active material preferably contains a lithium-nickel composite oxide such as $Li_xNiO_2$, $Li_xCo_yNi_{1-y}O_2$, $Li_xNi_{1-y}M_yO_z$ (where M is at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$), and the like.

Examples of the conductive auxiliary agent used for the positive electrode mixture layer 7 include carbon-based particles such as carbon black (CB), acetylene black (AB), Ketjen black, carbon nanotubes (CNT), and graphite. These may be used alone or by combining two or more thereof. As the conductive auxiliary agent used for the positive electrode mixture layer, carbon black is preferably used.

Examples of the binder used for the positive electrode mixture layer 7 include fluororesins such as polytetrafluoroethylene (PTFE) and polyvinylidene fluoride (PVDF), polyacrylonitrile (PAN), polyimide resins, acrylic resins, and polyolefin resins. These may be used alone or by combining two or more thereof. As the binder used for the positive electrode mixture layer 7, polyvinylidene fluoride is preferably used. The molecular weight of the binder for the positive electrode mixture layer 7 is 900,000 or higher, and preferably 1.4 million or higher.

In the positive electrode plate 4 produced as described above, the undercoat layer 6 contains the conductive auxiliary agent 6a having an average diameter of 12 nm or smaller. Further, the molecular weight of the binder used respectively for the undercoat layer 6 and the positive electrode mixture layer 7 is 900,000 or higher, and the thickness of the undercoat layer 6 is 0.20 μm or smaller. With these features, the interfacial resistance of the positive electrode plate 4 swollen with the non-aqueous electrolyte containing the non-aqueous solvent can be sufficiently reduced. An explanation in this regard is given below by reference to FIG. 3.

Figure 3:
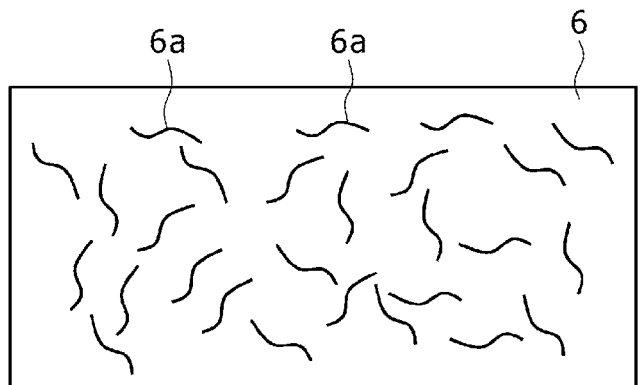
FIG. 3 is a diagram conceptually showing a distribution of a conductive auxiliary agent observed when the undercoat layer shown in FIG. 2 is viewed from a direction orthogonal to the plane direction.

FIG. 3 is a diagram conceptually showing the distribution of the conductive auxiliary agent 6a observed when the undercoat layer 6 is viewed from a direction orthogonal to the plane direction. Although all of the conductive auxiliary agent 6a pieces are shown as being separate from each other in FIG. 3, it is presumed that several to 10 pieces are actually overlapped with each other. For example, with the average diameter of the conductive auxiliary agent 6a being 12 nm or smaller, the distance between the surface of the positive electrode core 5 after swelling and the positive electrode mixture layer 7 tends to be small. It is presumed that this facilitates the conductive auxiliary agent 6a to form an electrical path between the positive electrode core 5 and the positive electrode mixture layer 7, and that the interfacial resistance can thereby be reduced. Further, with the molecular weight of the binder used respectively for the undercoat layer 6 and the positive electrode mixture layer 7 being 900,000 or higher, swelling of the binder that occurs when the positive electrode plate 4 is immersed in the electrolyte solution is suppressed. Since this also tends to result in a short distance between the surface of the positive electrode core 5 after swelling and the positive electrode mixture layer 7, it is presumed that the interfacial resistance can be reduced in the same manner as described above. Further, with the thickness of the undercoat layer 6 being 0.20 μm or smaller, the distance between the surface of the positive electrode core 5 after swelling and the positive electrode mixture layer 7 again tends to be small, and it is therefore presumed that the interfacial resistance can be reduced in the same manner as described above.

[Negative Electrode]

The negative electrode plate 8 comprises a negative electrode core and a negative electrode mixture layer formed on a surface of the negative electrode core. For the negative electrode core, it is possible to use, for example, a foil of a metal that is stable in the potential range of the negative electrode such as copper, a film having such a metal disposed on its surface layer, or the like. The negative electrode mixture layer contains a negative electrode active material. The negative electrode plate 8 can be produced by applying a negative electrode mixture slurry containing the negative electrode active material onto the negative electrode core, drying the applied slurry to form a negative electrode mixture layer, and then rolling this negative electrode mixture layer.

The negative electrode active material is not particularly limited so long as it can reversibly occlude and release lithium ions, and it is possible to use, for example, a carbon material such as natural graphite or artificial graphite, a metal that forms an alloy with lithium such as silicon (Si) or tin (Sn), an alloy or composite oxide containing a metal element such as Si or Sn, or the like. As the negative electrode active material, a carbon material is preferable, and natural graphite is more preferable. The negative electrode active material may be used alone or by combining two or more thereof.

[Separator]

For the separator, for example, a porous sheet having ion permeability and insulating property is used. Specific examples of the porous sheet include a microporous thin film, a woven fabric, and a non-woven fabric. As the material of the separator, olefin resins such as polyethylene and polypropylene, cellulose, and the like are preferred. The separator may be a laminate having a cellulose fiber layer and a thermoplastic resin fiber layer made of olefin resin or the like. The separator may alternatively be a multilayer separator including a polyethylene layer and a polypropylene layer, and a separator having a surface coated with a material such as aramid resin or ceramic may be used.

EXAMPLES

While Examples will be used below to further explain the positive electrode plate 4, which is an electrode plate for non-aqueous electrolyte secondary battery according to the present disclosure, the present disclosure is not limited to these Examples.

Example 1

[Production of Positive Electrode Plate]

As the positive electrode active material, a composite oxide represented by $LiNi_{0.35}Co_{0.35}Mn_{0.30}O_2$, which is a lithium-nickel-cobalt-manganese composite oxide, was used. The positive electrode active material. PVDF serving as a binder, and carbon black were mixed together at a mass ratio of 90.3:2.7:7.0, and the mixture was kneaded while adding N-methyl-2-pyrrolidone to thereby prepare a positive electrode mixture slurry. The molecular weight of the PVDF for the mixture layer was 1.1 million. Further, an undercoat dispersion liquid containing carbon nanotubes as the conductive auxiliary agent 6a was applied to both sides of an elongate positive electrode core 5 made of an aluminum foil having a thickness of 15 μm, and the applied films were dried to obtain a positive electrode core 5 having an undercoat layer 6 formed on its surfaces. Here, the average diameter of the conductive auxiliary agent 6a was 7.5 nm, the average length of the conductive auxiliary agent 6a was 100 μm, and the BET specific surface area was 550 m²/g. Further, as the binder for the undercoat layer 6. PVDF having a molecular weight of 1.1 million was used. The thickness of the undercoat layer 6 was 0.15 μm. Table 1 shows the conductive auxiliary agent 6a of the undercoat layer 6, the PVDF, and the thickness of the undercoat layer 6 for Example 1. Table 1 also shows such information regarding Examples 2 to 8 and Comparative Examples 1 to 5 described further below. In Table 1, the average diameter and the average length of the conductive auxiliary agent are indicated as "diameter" and "length", respectively.

Example 5

A positive electrode plate 4 was produced in the same manner as in Example 1 except that the thickness of the undercoat layer 6 was 0.08 pin, and the molecular weight of each of the PVDF used for the undercoat layer 6 and the PVDF used for the positive electrode mixture layer 7 was 1.4 million. The produced positive electrode plate 4 was used as Example 5.

TABLE 1

| | Undercoat Layer | | | | | Mixture Layer | Resistance Measurement Results | |
| | Conductive Auxiliary Agent | | | PVDF | | PVDF | (1) After Compressing Electrode Plate | (2) After Swelling and Drying Electrode Plate |
| | Diameter nm | Length um | BET m2/g | Molecular Weight | Thickness um | Molecular Weight | Interfacial Resistance Ωcm2 | Interfacial Resistance Ωcm2 |
|---|---|---|---|---|---|---|---|---|
| Example 1 | 7.5 | 100 | 550 | 1.1 million | 0.15 | 1.1 million | 0.11 | 1.21 |
| Example 2 | 7.5 | 100 | 550 | 1.1 million | 0.08 | 1.1 million | 0.03 | 0.96 |
| Example 3 | 7.5 | 100 | 550 | 1.1 million | 0.07 | 1.1 million | 0.03 | 0.66 |
| Example 4 | 7.5 | 100 | 550 | 1.1 million | 0.06 | 1.1 million | 0.05 | 0.81 |
| Example 5 | 7.5 | 100 | 550 | 1.4 million | 0.08 | 1.4 million | 0.03 | 0.76 |
| Example 6 | 7.5 | 100 | 550 | 1.1 million | 0.07 | 1.4 million | 0.04 | 0.82 |
| Example 7 | 12 | 20 | 270 | 1.1 million | 0.09 | 1.1 million | 0.08 | 1.25 |
| Example 8 | 7.5 | 100 | 550 | 900,000 | 0.09 | 900,000 | 0.04 | 0.98 |
| Comparative Example 1 | 7.5 | 100 | 550 | 1.1 million | 0.32 | 1.1 million | 0.29 | 3.76 |
| Comparative Example 2 | 7.5 | 100 | 550 | 700,000 | 0.08 | 700,000 | 0.04 | 1.39 |
| Comparative Example 3 | 7.5 | 100 | 550 | 1.1 million | 0.07 | 700,000 | 0.04 | 1.30 |
| Comparative Example 4 | 50 | 10 | 110 | 1.1 million | 1.34 | 1.1 million | 0.24 | 1.83 |
| Comparative Example 5 | 50 | 10 | 110 | 1.1 million | 0.18 | 1.1 million | 0.16 | 2.11 |

Next, the positive electrode mixture slurry was applied onto the undercoat layers 6 of the positive electrode core 5, and the applied films were dried. The dried applied films were compressed to a packing density of 2.5 g/cm³, and the product was cut to a predetermined electrode size. A positive electrode plate 4 having positive electrode mixture layers 7 formed on both sides of the positive electrode core 5 was thereby produced.

Example 2

A positive electrode plate 4 was produced in the same manner as in Example 1 except that the thickness of the undercoat layer 6 was 0.08 μm. The produced positive electrode plate 4 was used as Example 2.

Example 3

A positive electrode plate 4 was produced in the same manner as in Example 1 except that the thickness of the undercoat layer 6 was 0.07 μm. The produced positive electrode plate 4 was used as Example 3.

Example 4

A positive electrode plate 4 was produced in the same manner as in Example 1 except that the thickness of the undercoat layer 6 was 0.06 μm. The produced positive electrode plate 4 was used as Example 4.

Example 6

A positive electrode plate 4 was produced in the same manner as in Example 1 except that the thickness of the undercoat layer 6 was 0.07 μm, and the molecular weight of the PVDF used for the positive electrode mixture layer 7 was 1.4 million. The produced positive electrode plate 4 was used as Example 6.

Example 7

A positive electrode plate 4 was produced in the same manner as in Example 1 except that the conductive auxiliary agent 6a had an average diameter of 12 nm, an average length of 20 μm, and a BET specific surface area of 270 m²/g, and the thickness of the undercoat layer 6 was 0.09 μm. The produced positive electrode plate 4 was used as Example 7.

Example 8

A positive electrode plate 4 was produced in the same manner as in Example 1 except that the thickness of the undercoat layer 6 was 0.09 μm, and the molecular weight of each of the PVDF used for the undercoat layer 6 and the PVDF used for the positive electrode mixture layer 7 was 900,000. The produced positive electrode plate 4 was used as Example 8.

Comparative Example 1

A positive electrode plate was produced in the same manner as in Example 1 except that the thickness of the undercoat layer was 0.32 μm. The produced positive electrode plate was used as Comparative Example 1.

Comparative Example 2

A positive electrode plate was produced in the same manner as in Example 1 except that the thickness of the undercoat layer was 0.08 yum, and the molecular weight of each of the PVDF used for the undercoat layer and the PVDF used for the positive electrode mixture layer was 700,000. The produced positive electrode plate was used as Comparative Example 2.

Comparative Example 3

A positive electrode plate was produced in the same manner as in Example 1 except that the thickness of the undercoat layer was 0.07 μm, and the molecular weight of the PVDF used for the positive electrode mixture layer was 700,000. The produced positive electrode plate was used as Comparative Example 3.

Comparative Example 4

A positive electrode plate was produced in the same manner as in Example 1 except that the conductive auxiliary agent had an average diameter of 50 nm, an average length of 10 μm, and a BET specific surface area of 110 m$^2$/g, and the thickness of the undercoat layer was 1.34 μm. The produced positive electrode plate was used as Comparative Example 4.

Comparative Example 5

A positive electrode plate was produced in the same manner as in Example 1 except that the conductive auxiliary agent had an average diameter of 50 nm, an average length of 10 μm, and a BET specific surface area of 110 m$^2$/g, and the thickness of the undercoat layer was 0.18 μm. The produced positive electrode plate was used as Comparative Example 5.

[Measurement of Interfacial Resistance]

In the positive electrode plate 4 of each of the Examples and Comparative Examples, the interfacial resistance (sheet resistance Ωcm2) was measured, which is the resistance between the positive electrode core 5 and the positive electrode mixture layer 7. The interfacial resistance was measured at a point after the positive electrode plate 4 was compressed as described above, and at a point after the positive electrode plate 4 was swelled and dried subsequent to compression (i.e., after swelling and drying). For measuring the interface resistance, an electrode resistance measuring instrument (device name: RM2610) manufactured by Hioki E.E. Corporation was used.

Here, the interfacial resistance of the electrode plate that has been swollen with a non-aqueous solvent and then dried was evaluated. Difficulties exist in measuring the interfacial resistance of an electrode plate that remains swollen with a non-aqueous solvent. Accordingly, the electrode plate was evaluated by measuring the interfacial resistance in a state after swelling and drying, which is close to the swollen state and which enables measurement of the interfacial resistance. In order to place the positive electrode plate 4 in a state after swelling and drying, after the positive electrode plate 4 was compressed as described above, the positive electrode plate 4 was placed in a solution of dimethyl carbonate and left overnight at a temperature of 85° C., and then taken out from the solution and dried in a dryer at a temperature of 130° C. for 3 to 4 hours. After the drying, the interfacial resistance was measured. Table 1 shows the results obtained by measuring the interfacial resistance after compressing and the interfacial resistance after swelling and drying in each of the Examples and Comparative Examples.

According to the results shown in Table 1, the interfacial resistance of the positive electrode plate 4 after swelling and drying could be significantly reduced in Examples 1 to 8 as compared with Comparative Examples 1 to 5. It is presumed that the interfacial resistance value is significantly reduced also when the electrode plate is in a state swollen with the non-aqueous solvent, and based on this, the advantageous effect of the present disclosure could be confirmed. For example, when comparing Examples 1 to 4 with Comparative Example 1, it is considered that the interfacial resistance of the positive electrode plate 4 after swelling and drying could be reduced in Examples 1 to 4 because the thickness of the undercoat layer 6 was smaller than that in Comparative Example 1.

When comparing Examples 2, 5 and 6 with Comparative Examples 2 and 3, while the thickness of the undercoat layer 6 was 0.20 μm or less in all these cases, it is considered that the interfacial resistance of the positive electrode plate 4 after swelling and drying could be reduced in Examples 2, 5 and 6 because the molecular weight of the PVDF in the undercoat layer 6 and the positive electrode mixture layer 7 was higher than that in Comparative Examples 2 and 3.

When comparing Examples 2 and 7 with Comparative Example 4, while the molecular weight of the PVDF in both of the undercoat layer 6 and the positive electrode mixture layer 7 was 900,000 or higher in all these cases, it is considered that the interfacial resistance of the positive electrode plate 4 after swelling and drying could be reduced in Examples 2 and 7 because, as compared to in Comparative Example 4, the thickness of the undercoat layer 6 was smaller and the diameter of the conductive auxiliary agent 6a was smaller.

When comparing Example 4 with Comparative Example 5, while, in both cases, the thickness of the undercoat layer 6 was 0.20 μm or less and the molecular weight of the PVDF in both of the undercoat layer 6 and the positive electrode mixture layer 7 was 900,000 or higher, it is considered that the interfacial resistance of the positive electrode plate 4 after swelling and drying could be reduced in Example 4 because the diameter of the conductive auxiliary agent 6a was smaller than that in Comparative Example 5.

REFERENCE SIGNS LIST 1 outer casing
2 sealing plate
3 electrode assembly
4 positive electrode plate
4a positive electrode core exposed portion
5 positive electrode core
6 undercoat layer
6a conductive auxiliary agent
7 positive electrode mixture layer
8 negative electrode plate
8a negative electrode core exposed portion
9 positive electrode current collector
10 negative electrode current collector

11 positive electrode terminal
12 positive electrode bolt portion
13 positive electrode insertion portion
14 negative electrode terminal
15 negative electrode bolt portion
18 negative electrode insertion portion
19 electrolyte injection port
100 secondary battery

The invention claimed is:

1. An electrode plate for non-aqueous electrolyte secondary battery, comprising an electrode core having an undercoat layer formed on its surface, and an electrode mixture layer formed on the undercoat layer of the electrode core, wherein an average diameter of a conductive auxiliary agent used for the undercoat layer is 7.5 nm or more and 12 nm or smaller, and an average length of the conductive auxiliary agent is 100 μm or longer, a BET specific surface area of the conductive auxiliary agent is 550 m$^2$/g or larger, a molecular weight of a binder used for the undercoat layer is 900,000 or higher and 1,400,000 or lower, a thickness of the undercoat layer is 0.06 μm or more and 0.09 μm or smaller, and a molecular weight of a binder used for the electrode mixture layer is 900,000 or higher and 1,400,000 or lower, both of the binder used for the undercoat layer and the binder used for the electrode mixture layer contain polyvinylidene fluoride, and the binder used for the undercoat layer is a single binder contained therein and is substantially composed of polyvinylidene fluoride.

2. The electrode plate for non-aqueous electrolyte secondary battery according to claim 1, wherein the conductive auxiliary agent is carbon nanotubes.

3. A non-aqueous electrolyte secondary battery, comprising a positive electrode plate, a negative electrode plate, and a non-aqueous electrolyte, wherein at least one of the positive electrode plate and the negative electrode plate is the electrode plate for non-aqueous electrolyte secondary battery according to claim 1.

* * * * *